Feb. 24, 1959 G. B. RICHARDS 2,874,715
FLUID CONTROL DEVICE
Filed April 1, 1954 2 Sheets-Sheet 1
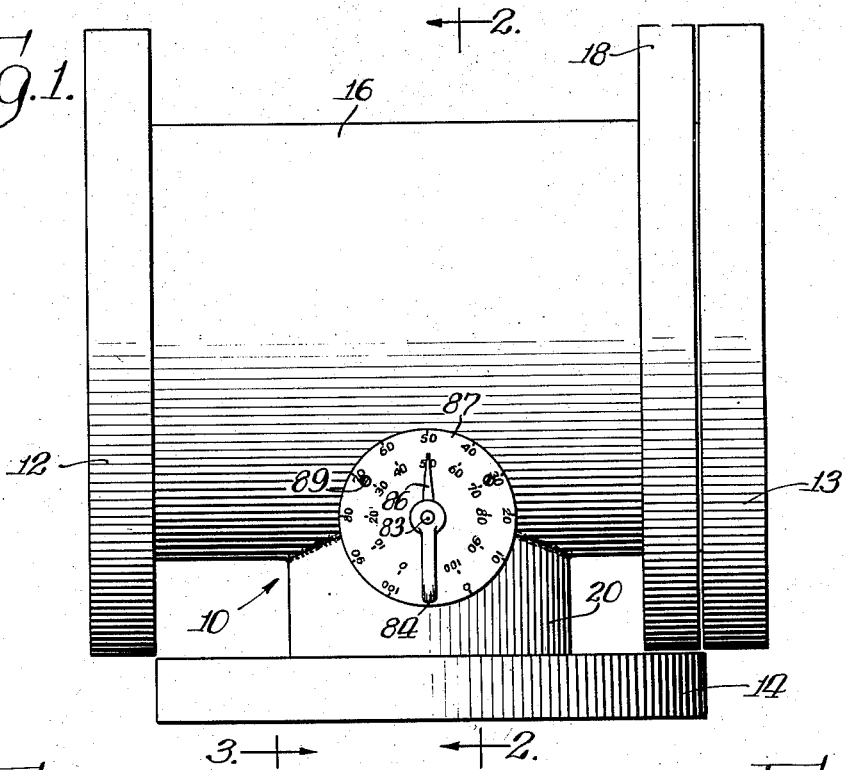
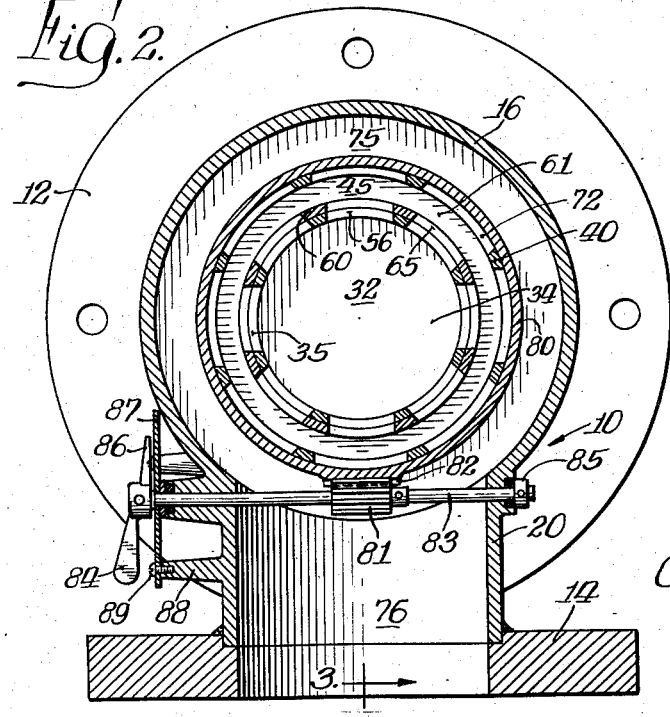
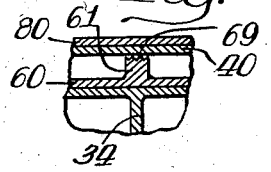
INVENTOR.
George B. Richards
BY
Fidler, Crouse & Beardsley
Attys.

Feb. 24, 1959
G. B. RICHARDS
2,874,715
FLUID CONTROL DEVICE
Filed April 1, 1954
2 Sheets-Sheet 2
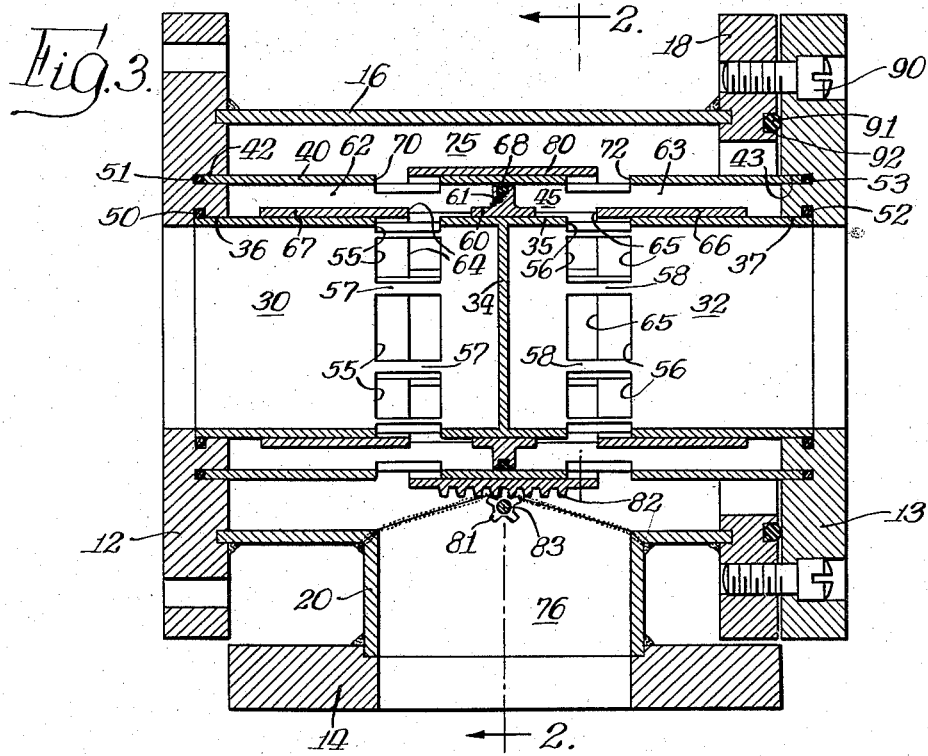
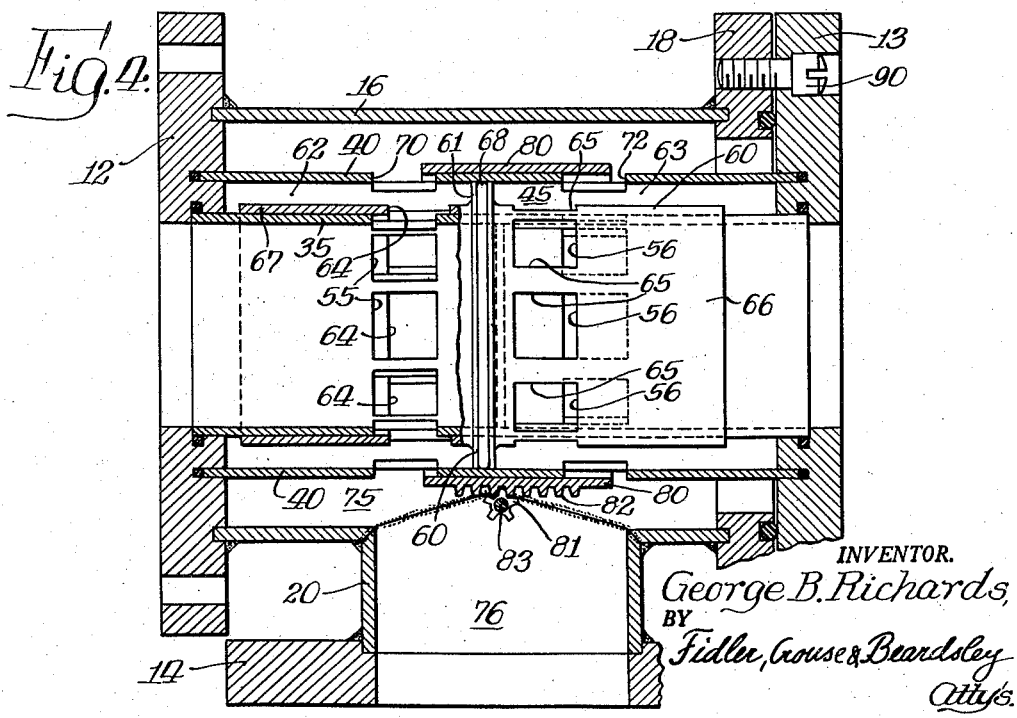
INVENTOR.
George B. Richards,
BY
Fidler, Crouse & Beardsley
Atty's.

United States Patent Office 2,874,715
Patented Feb. 24, 1959

2,874,715

FLUID CONTROL DEVICE

George B. Richards, Deerfield, Ill., assignor, by mesne assignments, to Liquid Controls Corporation, North Chicago, Ill., a corporation of Illinois Application April 1, 1954, Serial No. 420,415

14 Claims. (Cl. 137—98)

The present invention relates generally to fluid control apparatus and more particularly to a device for mixing two liquids together in any desired ratio.

Devices now commonly in use for mixing or "blending" together two liquids are usually very complex and difficult to manufacture and are usually very large and heavy when they are made to handle liquids in large volumes. Furthermore, such devices usually utilize valve arrangements that require several fluid seals and packings which often are at least partially soluble in or otherwise adversely affected by some of the liquids for which the apparatus is employed. Such seals and packings often cause contamination of corrosive fluids and filtering or purifying means have to be provided in order to remove such contamination. Although such devices are satisfactory for certain applications, they are not satisfactory for use in mixing fuel mixtures for aircraft, for example, where space and weight are at a premium, where a high degree of purity of the fuel is essential and where simplicity and dependability of equipment are highly desirable. Many of the liquid mixing devices now in use are designed for operation in a certain position and thus may not give optimum performance when employed in aircraft. It is contemplated by the present invention to provide a fluid mixing apparatus which is not subject to the objections and difficulties noted above in respect of apparatus of this general type now in common use.

Accordingly, a general object of the present invention is to provide an improved fluid control apparatus.

A more specific object of the invention is to provide a novel fluid mixing unit that has none of the disadvantages mentioned above inherent in mixing units now in general use.

Another object is to provide a mixing unit which, although of general utility, is particularly well adapted for mixing fuels in aircraft because of its large capacity relative to its size and weight and because of its freedom from contamination even of highly erosive fluids while being of relatively small size and light weight.

Another object is to provide a novel fluid mixing unit wherein the various operating parts are of simple configuration, thus making it practicable to fashion them with ordinary machine shop tools from corrosion resistant materials in the form in which they are commercially available.

Another object is to provide a novel and simple fluid mixing unit having only a few moving parts which do not have to be made to close tolerances.

Another object is to provide a novel fluid mixing unit that utilizes balanced valve elements of simple configuration and of small size for balancing the pressures of two fluids to be mixed.

Another object of the invention is to provide a novel fluid mixing unit so constructed and arranged as to require the use of substantially no materials that may adversely affect corrosive fluids.

Still another object is to provide a novel fluid mixing unit so constructed that the fluid flows radially outwardly with a very low pressure drop between the inlet chambers and the mixing chamber.

Still another object is to provide an automatic pressure control mechanism for a fluid mixing unit, which is extremely sensitive and highly responsive to pressure variations.

These and other objects and advantages of my invention will be apparent from the following description of an illustrative embodiment thereof when considered with the accompanying drawings wherein:

Figure 1 is a plan view of the unit;

Fig. 2 is a cross-sectional view through the unit taken along line 2—2 of Fig. 1;

Fig. 3 is a longitudinal sectional view taken along line 3—3 of Fig. 2;

Fig. 4 is like Fig. 2 but illustrating the control parts in different positions; and Fig. 5 is a fragmentary sectional view showing an alternate form of the seal of the pressure equalizing member.

The mixing unit in accordance with my invention is shown in Fig. 1 as having a tubular housing 10 in a general form of a T provided with flanges 12 and 13 for connecting the unit to lines carrying fluids to be mixed and a flange 14 for connecting it to a line for carrying the fluid mixture to a point of storage or utilization. The housing 10 comprises a tubular housing portion 16 rigidly secured as by welding between the flange 12 and a flange ring 18 which may conveniently be fashioned from a standard flange like flanges 12 to 14, and a tubular housing portion 20 communicating with the housing portion 16 and rigidly secured thereto at right angles as by means of a butt weld, preferably halfway between the ends thereof.

The internal construction of the unit with the control elements disposed in their midpositions is shown in Fig. 3. An inlet chamber 30 and an inlet chamber 32 are formed on opposite sides of a blind dividing wall 34 in a tubular member 35 received in inwardly opening recesses 36 and 37 respectively in the respective mounting flanges 12 and 13. A tubular member 40 of larger diameter than the tubular member 35 is concentrically mounted with respect thereto between the flanges 12 and 13 in respective annular grooves 42 and 43 formed in the flanges, to define, with member 35, an annular pressure balancing chamber 45. Although the tubular members 35 and 40 may, if desired, be permanently secured to one or both of the flanges 12 and 13 as by welding or brazing, I prefer that they be removable with respect to at least one of them, preferably the flange 13, in order to make the parts accessible for inspection, cleaning and replacing. In the form of the invention illustrated in Fig. 2 I have shown the tubular members 35 and 40 to be removably mounted with respect to the flanges 12 and 13 and in order to prevent fluid leaks between the joints I provide O-ring seals or gaskets 50 and 51 in the recess 36 and the ring groove 42, respectively, in the inner face of the flange 12, and corresponding O-ring seals or gaskets 52 and 53 in the recess 37 and the ring groove 43, respectively, in the face of the flange 13.

The inner tubular member 35 is provided with two axially spaced series or sets of rectangular, equally spaced inlet ports or orifices 55 and 56 extending about the circumference thereof and defined between a plurality of longitudinally extending ribs 57 and 58, respectively. The ports 55 and 56 are preferably symmetrically disposed with respect to the center dividing wall 34.

The total area of the ports 55 and the ports 56 should be equal and at least as great as the cross-sectional area of the inlet chambers 30 and 32. All of the ports within each set are preferably circumferentially aligned and equally spaced from the dividing wall 34, although it may be found desirable to shape the individual ports differentially and to arrange them in staggered relationship in order to achieve conformance with predetermined performance curves.

A pressure balancing sleeve member 60 is slidably mounted on the inner tubular member 35 within the pressure balancing chamber 45 and is provided with an integral annular sealing flange or ring piston 61 and divides the control chamber 45 into two separate and mutually sealed chamber portions 62 and 63. The pressure balancing sleeve 60 is provided with two axially spaced series of flow control ports or orifices 64 and 65 which may conveniently be dimensioned like the ports 55 and 56 in the stationary tubular member 35. The axial spacing between the series of ports 64 and 65 in the control sleeve 60 is less than the axial spacing between the ports 55 and 56 in the tubular member 35 by an amount equal to or slightly more than the axial width of the ports 55 and 56. Thus when the ports 64 in the control sleeve are in full alignment with the ports 55 in the member 35, the ports 56 will be completely closed by the skirt portion 66 of the sleeve 60 extending to the right of the ports 65 as viewed in Fig. 3. Reversely, when the ports 65 of the sleeve 60 are in alignment with the ports 56 in the tubular member 35, the ports 55 thereof will be completely closed by the skirt portion 67 of the sleeve. The skirt portions 66 and 67 should be made sufficiently long to abut the respective flanges 12 and 13 when the sleeve member 60 moves a little past its respective two positions wherein it closes off fully one of the sets of ports 55, 56 and fully opens the other. This will prevent any undesirable movements of the sleeve 60 past these maximum positions.

The pressure chamber portions 62 and 63 separated by the annular sealing flange 61 of the sleeve member 60 should be substantially sealed from each other in order to prevent pressure equalization therebetween without a corresponding movement of the sleeve 60, but as a practical matter some slight leakage of fluid between the sleeve 60 and the inner and outer confining tubular members 35 and 40 will tend to reduce friction therebetween and thus permit the sleeve to move freely, without adversely affecting the efficacy of the unit. I have shown an O-ring seal 68 (Figs. 3 and 4) extending about the circumference of the flange 61 in order to prevent flow of fluid thereacross but for most applications it will be sufficient to provide an arrangement as shown in Fig. 5 wherein the flange 61 is provided with a plurality of minute circumferential grooves 69 providing a labyrinthine liquid seal between the periphery of the flange 60 and the adjacent tubular wall of the member 40. Such a labyrinthine seal, which is very effective in obstructing fluid flow thereacross, prevents physical contact between the adjacent surfaces thus greatly reducing the friction therebetween.

The outer tubular member 40 is provided with two sets or series of circumferentially arranged outlet ports 70 and 72 for connecting the respective pressure balancing chamber portions 62 and 63 with a mixing chamber 75 defined between the tubular member 40 and the tubular housing portion 16 and communicating with the housing portion 20 defining the discharge outlet from the mixing chamber. The outlet ports 70 and 72 in the outer tubular member 40 may suitably be arranged in radial alignment with the inlet ports 55 and 56 in the inner tubular member 35, but this is not necessary because there is no positional interdependence between the inlet ports and the outlet ports.

The unit preferably includes means within the housing for setting the unit to mix the two fluids in predetermined ratios. To this end I provide a sleeve 80 slidably mounted on the outer tubular member 40 and extending in its center position as shown in Fig. 3 between the axial center lines of the outlet ports 70 and 72. When the sleeve 80 is in the mid position shown in Fig. 3, the openings of ports 70 and 72 will be throttled to the same extent, and equal volumes of fluids will flow therethrough as long as the fluid pressures within the chamber portions 62 and 63 are equal. The mixing ratio control sleeve 80 is actuated by means of a pinion 81 engaging a rack 82 rigidly secured to the external surface of the sleeve so as to extend in an axial direction thereof. The pinion 81 and the rack 82 are preferably made with rather long teeth so that the meshing teeth of the pinion and rack will prevent the sleeve 80 from rotating with respect to the tubular member 40. Other means well known in the art may, of course, be provided for preventing the sleeve 80 from rotation on the tubular member 40 while permitting free axial movements thereon.

The pinion 81 is carried by a shaft 83 and is rigidly affixed thereto so as to rotate therewith. The shaft 83 is sealingly journaled in the housing portion 20 as indicated in Fig. 2 and has an operating handle 84 secured to one end and collar 85 secured to the other so as to keep the pinion 81 in alignment with the rack 82. The handle 84 is formed with a pointer 86 that sweeps over a circular scale 87 fastened on a plurality of posts 88 on the housing 10 by means of screws 89. The circular scale 87 is graduated to indicate the mixing ratio to which the unit is set. In the mid position of the handle 84 as shown in Fig. 1, the pointer 86 indicates that the unit is set to mix the fluids in a ratio of 1 to 1.

The mounting flange 13 is secured to the ring 18 by means of a plurality of shoulder screws 90 recessed in the flange and screwed into threaded openings in the flange ring 18. An O-ring seal 91 in a groove 92 in the face of the ring 18 is provided in order to prevent the escape of fluid from the mixing chamber 75. The likelihood of contamination of the fluid mixture from the ring seal 91 is rather remote, but this seal may be omitted and a ground joint provided at that point.

Coming now to the description of the operation of my device, it will first be assumed that the pressures of the two fluids in the chambers 30 and 32 are exactly equal and that the ratio control sleeve 80 is set to its mid position wherein the total open area of the ports 70 is exactly the same as the total open area of the ports 72. It will be assumed for the purpose of illustration that the pressure balancing member 60 is initially in a position to the left of its center position due to an immediately preceding unbalanced condition in the fluid sources, so that the total unobstructed area of the inlet ports 55 is substantially greater than the total unobstructed area of the inlet ports 56. The pressure on the left hand side of the flange 61 of the pressure balancing member 60 will under the assumed conditions be greater than the pressure on the right hand side due to the larger flow area of the inlet ports 55 than that of the inlet ports 56. The pressure balancing member 60 is free to move axially within the chamber 45 and consequently, will be displaced to the right due to the unbalance of the pressures applied to the opposite sides thereof. Such movement of the balancing member 60 will reduce the total unobstructed area of the ports 55 while increasing by a proportionate amount the total unobstructed flow area of the ports 56. The axial forces applied to the member 60 will be balanced when it reaches a position wherein the total unobstructed areas of the ports 55 and 56 are the same and hence when the fluid pressures within the pressure chamber portions 62 and 63 on opposite sides of the balancing member are equal. The member 60 is in effect a completely balanced valve element and it may, therefore, be made of very light construction so that the effect of gravity on the member as the position of the mixing unit is varied will not appreciably affect the accuracy of the unit.

If the pressure in one of the inlet chambers 30 and 32 should now drop with respect to the pressure in the other, the balancing member 60 will immediately shift to a position wherein the unobstructed areas of the inlet ports 55 and 56 are so proportioned as to compensate for the difference in the pressures of the fluids in the inlet chambers. If, for instance, the pressure in inlet chamber 30 should drop to a value less than the pressure in the chamber 32 when the balancing member 60 is in its mid position as shown in Fig. 3, the pressure to the right of the member in the chamber portion 63 will be greater than on the left side thereof in the chamber portion 62 and the balancing member will be caused to move to the left, thereby reducing the total unobstructed area of the openings 56 and proportionally increasing the total unobstructed area of the ports 55. This will throttle the flow of fluid flowing from the chamber 32 while permitting a correspondingly freer flow from the chamber 30, to reduce the pressure difference across the balancing member 60. The member 60 will continue to move until it reaches a position wherein the total unobstructed areas of the ports 55 and 56 are so proportioned as to exactly compensate for the difference in the pressures within the inlet chambers 30 and 32. Once the volumetric ratio of the fluids to be mixed has been set by properly positioning the mixing ratio sleeve 80, the pressure balancing member 60 will control the proportionate flow of the fluids into the chamber portions 62 and 63 so that the fluids will enter the respective ports 70 and 72 at the same pressure and hence will flow into the mixing chamber in the proportion determined by the position of the mixing sleeve 80.

Assume, for example, that it is desired to mix the fluids entering the chambers 30 and 32 in the proportions 3 to 1. The handle 84 is now turned until the pointer is directed toward the point on the dial 87 which indicates a mixture of 75% of fluid #1 and 25% of fluid #2. Such movement of the handle will be transmitted to the mixing sleeve 80 through the shaft 83, the pinion 81 affixed to the shaft and the rack 82 fast on the mixing sleeve to move the sleeve the required amount to proportion the unobstructed openings of the ports 70 and 72 to pass the fluid in the desired volumetric ratios. Referring again to Fig. 3, if the fluid #1 enters the inlet chamber 30 and the fluid #2 enters the inlet chamber 32, the handle 84 is turned in a clockwise direction (Fig. 1) to turn pinion 81 in a clockwise direction by an equal amount to move the rack 82 and thereby the mixing sleeve 80 to the right to a position as indicated in Fig. 4 wherein the ports 70 have a total unobstructed flow area substantially three times as large as the unobstructed flow area of the ports 72. The sleeve 60 will position itself as described above so as to maintain equal fluid pressures at the ports 70 and 72 within the balancing chamber portions 62 and 63 so that the fluid will flow through the ports 70 and 72 in a ratio of substantially 3 to 1. This ratio may readily be varied from substantially 100% of fluid #1 to substantially 100% of fluid #2 by moving the handle 84 from one extreme position to the other.

The pinion 81 is preferably of such size that one complete revolution will impart an axial movement to the mixing sleeve 80 by an amount at least sufficient to displace it from a position wherein it will completely cover the ports 70 and to a position wherein it will completely close the ports 72. The dial can therefore be laid out so as to cover about 360 degrees, thus greatly simplifying the setting of the fluid mixing ratio.

Although the mixing unit in accordance with my invention has been described in terms of mixing of two fluids in volumetric ratios, it will be evident to those skilled in the art that the dial 87 may readily be modified to indicate ratios by weight when the specific gravities of the two fluids are known. When the fluids have the same specific gravity, the volumetric ratio will, of course, be the same as the ratio by weight. If, however, the specific gravities of the two fluids are different, such as when alcohol and water are to be mixed, the dial will have to be corrected accordingly.

The mixing unit in accordance with my invention has utility in a wide range of applications due to its simplicity, effectiveness and compactness. It is very well suited for mixing hot and cold water in predetermined ratios for shower baths, for example, to automatically compensate for variations in the pressures of the hot and cold water lines.

It was mentioned above that an important feature of the mixing unit in accordance with my invention resides in its simple and compact construction and the avoidance of the use of materials that may contaminate corrosive fluids, for which the unit may be employed. It was pointed out that the annular flange 61 on the pressure balancing sleeve 60 may be constructed as shown in Fig. 5 so as to avoid the use of the O-ring seal 68. The O-ring seals 50 and 51 in the face of the flange 12 may be omitted if the tubular members 35 and 40 are welded to the flange. If only one of the fluids is highly corrosive, this fluid line may then be connected to the inlet chamber 30 in which case the corrosive fluid will be kept in the left-hand end of the structure as viewed in Fig. 3 out of direct contact with the fluid seals in the right hand side. The seals 52 and 53 between the flange 13 and the tubular members 35 and 40 respectively may also be omitted in which case the flange may be made so as to receive these members with a press fit. Some leakage may occur at these points but such leakage is usually not of sufficient magnitude to affect materially the operation of the device.

It will be appreciated that this unit by reason of being mounted between three standard flanges may readily be installed in existing fluid lines. All the parts of the unit are readily accessible simply by removing the front flange 13. The housing portions 16 and 20, the tubular members 35 and 40 and the sleeves 60 and 80 may be fabricated from standard tubular stock of highly corrosion-resistant materials, such as one of the many so-called stainless steels, for example, in which case the partition 34 is secured as by welding within the inner tubular member 35. For many applications none of the parts need be manufactured to close tolerances because some leakage between the various parts is not objectionable where the mixing ratios do not have to be held very close. The unit is, however, very responsive to changing conditions and may advantageously be used where the flow ratios have to be kept within close limits. This is true, for example, when the mixing unit is used for blending alcohol water mixtures commonly used as coolants in reciprocating aircraft engines, jet aircraft engines, guided missiles and rockets. Alcohol water mixtures are commonly injected into combustive chambers of such devices, enabling the unit to operate during short periods of such injection at increased horsepower or thrust by lowering the temperature of the combustion chamber.

A mixing unit in accordance with my invention takes up substantially no more space than that required by a standard T fitting in the piping. The weight added thereby is almost insignificant.

The ratio control mechanism has been shown as being manually controlled because in most of the aforementioned applications there is a substantial variation in the ratio of mixture required. This ratio control adjustment may, of course, be made from a remote point manually or automatically by devices (not shown) well known in the art.

The high capacity of the mixing unit in accordance with my invention as compared to similar devices now available on the market is due to its geometric configuration which permits the fluid to flow through a minimum number of passages in substantially straight lines from the inlet chambers to the mixing chamber with a very small pressure drop. Since the mixing chamber is disposed circumferentially about the inlet chamber, it is possible to make it sufficiently large to guide the fluid flow smoothly into the outlet housing portion 20 with a minimum amount of turbulence and resultant pressure drop.

The fluid stream makes no sharp turns in passing from the inlet chambers to the mixing chamber as is the case in most commonly known mixing devices wherein the fluid is forced to pass through intricate fluid passages. The pressure equalization is effected directly from the main fluid streams at a point beyond the pressure balancing valve elements without necessitating the use of external conduits or internal fluid passages for this purpose.

Because of the light construction of the pressure balancing member 60, the extremely low friction between this member and the adjacent surfaces and the completely balanced nature thereof, this balancing is very sensitive to changes in fluid pressures so as to be able to compensate for pulsating variations in fluid pressures caused by certain types of fluid pumps.

Although only a specific embodiment of the invention has been described in detail, it will be apparent to those skilled in the art that various modifications may be made in the construction and the arrangements of the parts without departing from the true scope of the invention.

While the present invention has been described, for purposes of illustration, in connection with the blending of liquids, it will be understood that it may be employed with equal facility in the blending of gases. In fact, the device illustrated and described herein can be used for this purpose, without modification.

I claim:

1. A fluid control device comprising a housing defining a pressure balancing chamber, a pressure balancing member within said chamber including a wall portion dividing said chamber into two chamber portions, said pressure balancing member being slidably mounted within said chamber and movable therein in response to pressure differentials between said two chamber portions, means for limiting movement of said balancing member within said chamber, said housing having inlet openings therein disposed opposite said chamber portions, respectively, in all positions of said member within said pressure balancing chamber, said balancing member including valve portions cooperating with respective ones of said inlet openings to progressively close off one as the other is progressively opened as said balancing member is moved within said chamber with respect to said inlet openings in response to a pressure differential between said chamber portions, at least one or the other of said inlets being constantly in communication with said balancing chamber, thereby equalizing the pressures in said chamber portions, said housing further defining a mixing chamber and flow restricting outlet ports connecting each of said chamber portions with said mixing chamber, said inlet openings and outlet ports being positioned to provide a flow of fluid through said balancing chamber in a direction generally perpendicular to the walls of said pressure balancing member.

2. A fluid control device comprising a housing defining a pressure balancing chamber, a pressure balancing member within said chamber including a wall portion dividing said chamber into two chamber portions, said pressure balancing member being slidably mounted within said chamber and movable therein in response to pressure differentials between said two chamber portions, said housing having inlet openings therein disposed opposite said chamber portions, respectively, in all positions of said member within said pressure balancing chamber, said balancing member coacting with said inlet openings to progressively close off the openings opposite one chamber portion as the openings opposite the other chamber are progressively opened as said balancing member is moved within said chamber with respect to said inlet openings in response to a pressure differential between said chamber portions, at least one or the other of said inlets being constantly in communication with said balancing chamber, thereby equalizing the pressures in said chamber portions, said housing further defining a mixing chamber and including flow restricting outlet ports connecting each of said chamber portions with said mixing chamber, said inlet openings and outlet ports being positioned to provide a flow of fluid through said balancing chamber in a direction generally perpendicular to the walls of said pressure balancing member.

3. A fluid control device comprising a housing, partitions in said housing defining therewith a pair of inlet chambers, a pressure balancing chamber and a mixing chamber, a pressure balancing member within said pressure balancing chamber including a flange portion dividing said chamber into two chamber portions, said pressure balancing member being slidably mounted within said chamber and movable therein in response to pressure differentials between said two chamber portions, means for limiting movements of said balancing member within said chamber, one of said partitions having a set of inlet openings therein connecting each of said pressure balancing chamber portions with a different one of said inlet chambers, said balancing member including a skirt portion on each side of said flange portion extending over respective sets of inlet openings, a set of apertures in each of said skirt portions coacting with respective sets of inlet openings to progressively close off one set of inlet openings as the other set of inlet openings is progressively opened upon movement of said balancing member within said chamber with respect to said inlet openings in response to a pressure differential between said chamber portions, thereby equalizing the pressures in said chamber portions, another of said partitions having outlet ports therein connecting each of said pressure balancing chamber portions with said mixing chamber, flow ratio control means coacting with said outlet ports to control the flow area thereof, and means operably connected to said flow ratio control means for operating the latter.

4. A fluid control apparatus comprising a tubular member, a transverse wall member within said member defining two mutually sealed fluid inlet chambers, a second tubular member of larger diameter than said first named member concentrically disposed with respect thereto to define therewith a pressure balancing chamber, a tubular housing portion having a larger diameter than said second member and disposed therearound to determine therewith a fluid mixing chamber, all of said tubular members being fixed relatively to each other, a pressure balancing sleeve member slidably disposed in said pressure chamber to divide it into two separate pressure balancing chamber portions, means limiting the axial movements of said sleeve member within said pressure balancing chamber, said first named tubular member having inlet port means therein connecting said inlet chambers with respective ones of said chamber portions, said sleeve member having apertures therein spaced apart axially by a distance less than the axial distance between said inlet port means connected to the respective inlet chambers, said apertures being disposed on said sleeve to register with said port means connected to one inlet chamber while substantially obstructing said port means connected to the other inlet chamber and vice versa in the respective limit positions of said sleeve and to decrease progressively the unobstructed area of one of said port means while proportionally increasing progressively the unobstructed area of the other of said port means when said sleeve member is moved in one direction or the other from said limit positions, and said second tubular member having outlet ports therein connecting said chamber portions with said mixing chamber.

5. A fluid control apparatus comprising a tubular member, a transverse wall member within said member defining two mutually sealed fluid inlet chambers, a second tubular member of larger diameter than said first named member concentrically disposed with respect thereto to define therewith a pressure balancing chamber, a housing portion having a larger diameter than said second member and defining therewith a fluid mixing chamber, a pressure balancing sleeve member slidably disposed in said pressure chamber to divide it into two separate pressure chamber portions, said first named tubular member having axially spaced inlet port means therein connecting said inlet chambers with respective ones of said chamber portions, said sleeve member having apertures therein spaced apart axially by a distance less than the axial distance between said inlet port means and connected to the respective inlet chambers, said apertures being disposed on said sleeve to register with said port means connected to one inlet chamber while substantially obstructing said port means connected to the other inlet chamber and vice versa and to decrease progressively the unobstructed area of one of said port means while proportionally increasing progressively the unobstructed area of the other of said port means when said sleeve is moved axially in one or the other direction with respect to said port means within said pressure balancing chamber, said second tubular member having axially spaced outlet ports therein connecting said respective chamber portions with said mixing chamber, a sleeve member surrounding said second tubular member and slidably mounted thereon, said last named sleeve member having a position partially obstructing all of said outlet ports, and means operably connected to said sleeve member to displace selectively said sleeve member with respect to said outlet ports to increase gradually the unobstructed area of the outlet ports connected to one of said chamber portions while gradually decreasing the unobstructed area of the outlet ports connected to the other of said chamber portions.

6. A fluid control apparatus comprising a tubular member, a transverse wall member within said tubular member defining two mutually sealed fluid inlet chambers, a second tubular member of larger diameter than said first named member concentrically disposed in juxtaposed relation with respect thereto defining therewith a pressure balancing chamber, a housing portion extending about a substantial portion of said second member and defining therewith a fluid mixing chamber, all of said tubular members being fixed relatively to each other, a pressure balancing sleeve member freely slidable in said pressure chamber and including a circumferentially extending flange portion dividing said pressure balancing chamber into two separate pressure chamber portions, said first named tubular member having inlet port means therein connecting said inlet chambers with respective ones of said chamber portions, said sleeve member having apertures therein spaced apart axially by a distance less than the axial distance between said inlet port means connected to the respective inlet chambers, said apertures being disposed on said sleeve to register with said port means connected to one inlet chamber while said sleeve substantially obstructs said port means connected to the other inlet chamber and vice versa and to decrease progressively the unobstructed area of one of said port means while proportionally increasing progressively the unobstructed area of the other of said port means when said sleeve is moved axially in one or the other direction with respect to said port means within said pressure balancing chamber, and outlet ports in said second tubular member connecting said chamber portions with said mixing chamber.

7. A fluid control apparatus comprising a pair of flange members, a tubular member defining a pair of mutually sealed fluid inlet chambers, a second tubular member of larger diameter than said first named member, said flange members including means receiving opposite ends of said tubular members to maintain said tubular members fixedly in concentric juxtaposed relation with respect to each other to define a pressure balancing chamber between said tubular members, a housing portion extending about a substantial portion of said second member secured between said flange members and defining therewith a fluid mixing chamber, a pressure balancing sleeve member slidably disposed in said pressure chamber and including a circumferentially extending flange portion dividing said pressure balancing chamber into two separate pressure chamber portions, said first named tubular member having two axially spaced sets of circumferentially aligned, uniformly disposed inlet ports therein connecting said inlet chambers with respective ones of said chamber portions, said sleeve member having on each side of said flange portion a set of circumferentially aligned and uniformly disposed apertures, said sets of apertures being axially spaced by a distance less than the axial distance between sets of inlet ports connected to the respective inlet chambers, each of said sets of apertures being disposed on said sleeve to register with said set of ports connected to one inlet chamber while said sleeve substantially obstructs said set of ports connected to the other inlet chamber and vice versa and to decrease progressively the total unobstructed area of one set of ports while proportionally increasing progressively the total unobstructed area of the other set of ports when said sleeve is moved axially in one or the other direction with respect to said sets of ports within said pressure balancing cahmber, and outlet ports in said second tubular member connecting said chamber portions with said mixing chamber.

8. A fluid control apparatus comprising a tubular member defining a pair of mutually sealed fluid inlet chambers, a second tubular member of larger diameter than said first named member concentrically disposed in juxtaposed relation with respect thereto defining therewith a pressure balancing chamber, a housing portion extending about a substantial portion of said second member and defining therewith a fluid mixing chamber, a pressure balancing sleeve member slidably disposed in said pressure chamber and including a circumferentially extending flange portion dividing said pressure balancing chamber into two separate pressure chamber portions, said first named tubular member having two axially spaced sets of circumferentially aligned rectangular inlet ports therein connecting said inlet chambers with respective ones of said chamber portions, said sleeve member having on each side of said flange portion a set of circumferentially aligned rectangular apertures, said sets of apertures being spaced apart axially by a distance less than the axial distance between said sets of inlet ports connected to the respective inlet chambers, each of said sets of apertures being disposed on said sleeve to register with said set of ports connected to one inlet chamber while said sleeve substantially obstructs said set of ports connected to the other inlet chamber and vice versa and to decrease progressively the total unobstructed area of one set of ports while proportionally increasing progressively the total unobstructed area of the other set of ports when said sleeve is moved axially in one or the other direction with respect to said sets of ports within said pressure balancing chamber, a set of circumferentially aligned rectangular outlet ports in said second tubular member connecting each of said chamber portions with said mixing chamber, a flow control sleeve member in said mixing chamber slidably mounted on said second tubular member and having a position obstructing said outlet ports of both sets of ports by an equal amount, and means operably connected to said flow control sleeve member to displace the latter selectively in one direction or the other to adjust the ratio of the total unobstructed area of said two sets of outlet ports.

9. A fluid control apparatus comprising a pair of flange members, a tubular member defining a pair of mutually sealed inlet chambers, a second tubular member of larger diameter than said first named member, said flange members including means receiving one end of each of said tubular members to maintain said tubular members in concentric juxtaposed relation with respect to each other to define a pressure balancing chamber between said tubular members, a housing portion comprising a ring member, a tubular housing member extending about a substantial portion of said second member rigidly secured between said ring member and one of said flange members and defining with said second tubular member a fluid mixing chamber, a pressure balancing sleeve member slidably disposed in said pressure chamber and including a circumferentially extending flange portion dividing said pressure balancing chamber into two separate pressure chamber portions, said first named tubular member having inlet port means therein connecting said inlet chambers with respective ones of said chamber portions, said sleeve member having apertures therein disposed to coact with said inlet port means as said sleeve is displaced in response to fluid pressure differentials on opposite sides thereof to equalize said pressures within said chamber portions, a flow ratio control sleeve slidably disposed on said second tubular member, said second tubular member having outlet port means connecting respective ones of said chamber portions with said mixing chamber, said sleeve member coacting with said outlet port means to inversely vary the total flow opening of the ports connected to the respective chamber portions, means operably connected to said ratio control sleeve to selectively position said control sleeve with respect to said outlet port means to set the flow ratio to a predetermined value, a second tubular housing portion rigidly secured to said first named housing portion and defining a discharge chamber in communication with said mixing chamber, and a flange member rigidly secured to said second tubular housing portion.

10. A fluid control device comprising a housing having a pair of inlets and an outlet, partitions fixed in said housing and defining therewith a pressure balancing chamber and a mixing chamber communicating with said outlet, a pressure balancing member in said pressure balancing chamber dividing the latter into two chamber portions communicating respectively with said inlets and communicating with said mixing chamber, said pressure balancing member being freely slidable in said pressure balancing chamber for balancing the fluid pressures in said chamber portions, and means including a control member adjustably positionable in said housing for adjustably controlling the relative extents of flow of fluid from said balancing chamber portions to the mixing chamber.

11. A fluid control device comprising a housing having a pair of inlets, an outlet, a mixing chamber communicating with said outlet and a pressure balancing chamber, a pressure balancing sleeve freely slidable in said balancing chamber concentrically therewith and having a flange dividing the latter into two chamber portions communicating respectively with said inlets and communicating with said mixing chamber, and means including a control sleeve slidable in said housing concentrically with said balancing sleeve for adjusting the relative extent of communication between said balancing chamber portions respectively and said mixing chamber to thereby control the relative rates of flow of fluid through said device from said inlets respectively to said mixing chamber, the communication between said balancing chamber portions and said inlets respectively being closable only by said balancing sleeve, whereby said balancing chamber is in free communication with at least one inlet at all times.

12. A fluid control device comprising a housing having a pair of inlets and an outlet, generally concentric partitions in said housing defining therewith a pressure balancing chamber and a mixing chamber, a pressure balancing sleeve freely slidable in said balancing chamber concentrically with said partitions and having two valve portions and a circumferential flange between said valve portions dividing said balancing chamber into two chamber portions, one of said partitions having a pair of inlet port means therein providing communication between said inlets and said chamber portions respectively and positioned whereby one of said inlet port means is progressively opened upon movement of said balancing sleeve in one direction while the other inlet port means is progressively closed, and vice versa another of said partitions having a pair of outlet port means therein providing communication between said balancing chamber portions respectively and said mixing chamber, a control sleeve slidable over said other partition to progressively open one of said outlet port means upon movement of said control sleeve in one direction while the other is progressively closed, and vice versa, and means for adjustably positioning said control sleeve.

13. A fluid control device comprising a housing having a pair of inlets and an outlet, generally concentric partitions in said housing defining therewith a pressure balancing chamber and a mixing chamber, a pressure balancing sleeve freely slidable in said balancing chamber concentrically with said partitions and having two valve portions and a circumferential flange between said valve portions dividing said balancing chamber into two chamber portions, one of said partitions having a pair of inlet port means therein providing communication between said inlets and said chamber portions respectively and positioned whereby one of said inlet port means is progressively opened upon movement of said balancing sleeve in one direction while the other inlet port means is progressively closed, and vice versa another of said partitions having a pair of outlet port means therein providing communication between said balancing chamber portions respectively and said mixing chamber, a control sleeve slidable over said other partition to progressively open one of said outlet port means upon movement of said control sleeve in one direction while the other is progressively closed, and vice versa, and means for adjustably positioning said control sleeve, said inlet and outlet port means being disposed in alignment in a direction perpendicularly to the axis of said partitions whereby fluid flows through said balancing chamber in a direction perpendicularly to the axis thereof.

14. A fluid control device comprising a housing having a pair of inlets and an outlet, generally concentric partitions fixed in said housing defining therewith a pressure balancing chamber, and a pressure balancing sleeve freely slidable in said balancing chamber concentrically with said partitions and having two valve forming portions and a circumferential flange between said valve portions and dividing said balancing chamber into two chamber portions, one of said partitions having a pair of inlet port means therein providing communication between said inlets and said chamber portions respectively and positioned whereby one of said inlet port means is progressively opened upon movement of said balancing sleeve in one direction while the other inlet port means is progressively closed, and vice versa another of said partitions having a pair of outlet port means therein providing communication between said balancing chamber portions respectively and said mixing chamber, said inlet and outlet port means being disposed in alignment in a direction perpendicularly to the axis of said partitions whereby fluid flows through said balancing chamber in a direction perpendicularly to the axis thereof.

References Cited in the file of this patent

UNITED STATES PATENTS

| 990,557 | Holman | Apr. 25, 1911 |
| 1,508,938 | Powers et al. | Sept. 16, 1924 |
| 2,145,114 | Gibbs et al. | Jan. 24, 1939 |
| 2,233,871 | Parsons | Mar. 4, 1941 |
| 2,267,976 | Hermann | Dec. 30, 1941 |
| 2,609,146 | Heikes | Sept. 2, 1952 |
| 2,628,782 | Heikes | Feb. 17, 1953 |
| 2,647,529 | Wall | Aug. 4, 1953 |